United States Patent [19]

Utsugi

[11] Patent Number: 4,695,905
[45] Date of Patent: Sep. 22, 1987

[54] VIDEO RECORDING/REPRODUCING CAMERA

[75] Inventor: Mikio Utsugi, Tokyo, Japan

[73] Assignee: Fuji Photo Film Co., Ltd., Kanagawa, Japan

[21] Appl. No.: 735,348

[22] Filed: May 17, 1985

[30] Foreign Application Priority Data

May 19, 1984 [JP] Japan .................................. 59-99722

[51] Int. Cl.$^4$ .............................................. H04N 5/78
[52] U.S. Cl. .................................... 360/33.1; 360/60; 358/335; 358/909; 358/906
[58] Field of Search ...................... 360/33.1, 60, 35.1; 358/335, 906, 909

[56] References Cited

FOREIGN PATENT DOCUMENTS 127978 8/1982 Japan ................................... 358/906

Primary Examiner—Alan Faber
Attorney, Agent, or Firm—Stevens, Davis, Miller & Mosher

[57] ABSTRACT

A video recording/reproducing camera has a cover which covers control buttons associated with the reproduction operation to prevent an operator from touching the control buttons. A sensor switch detects whether or not the cover prevents the control buttons from being touched erroneously by the operator. When the sensor switch detects that the cover uncovers the control buttons to permit the control buttons to be touched by the operator, the operation of the video camera and the recording operation are disabled and only the reproduction mode is enabled. Therefore, the erroneous operations during the recording and reproduction modes are prevented.

12 Claims, 6 Drawing Figures

FIG_1
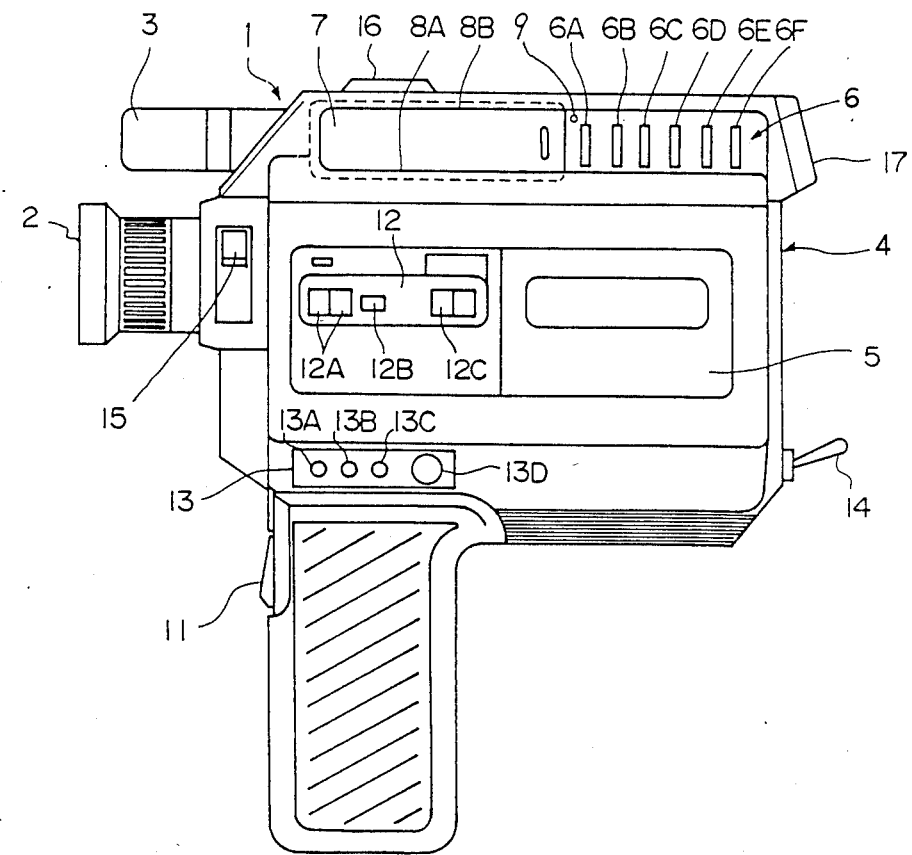

FIG_2
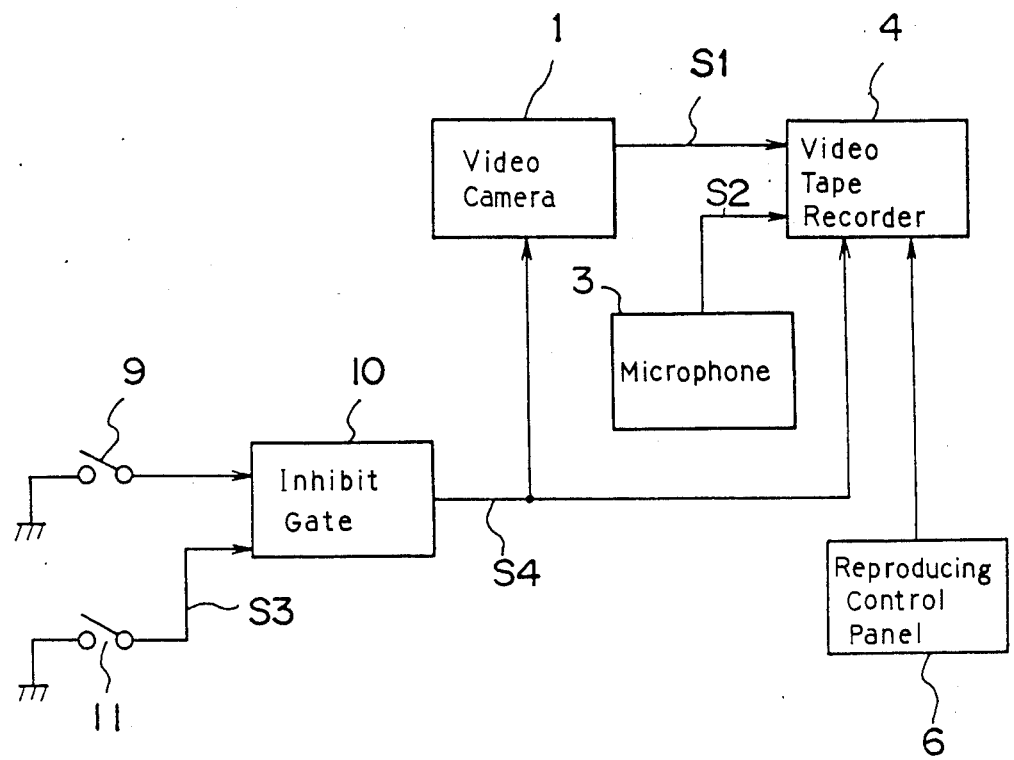

FIG_3A
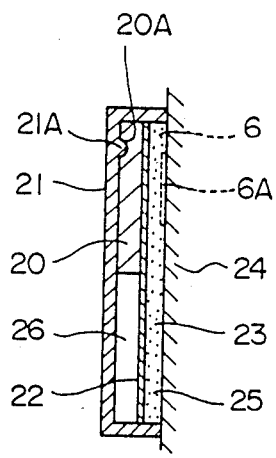
FIG_4
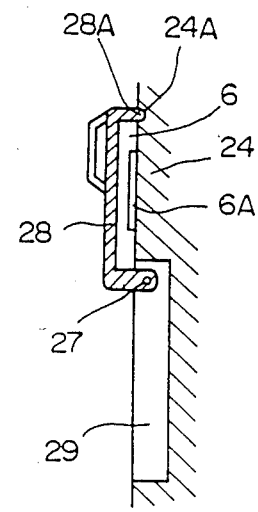
FIG_3B
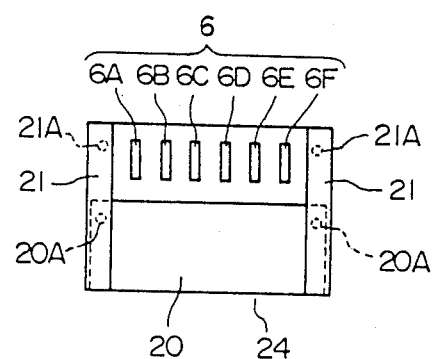

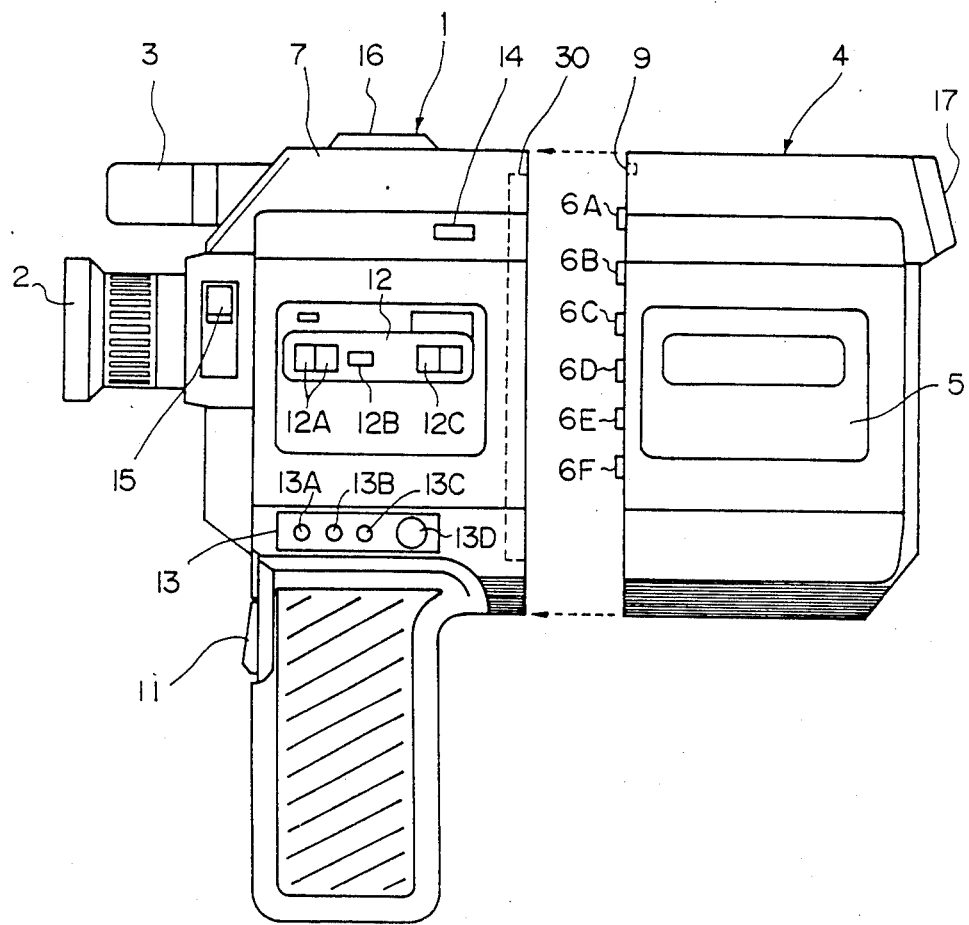
FIG_5

VIDEO RECORDING/REPRODUCING CAMERA

BACKGROUND OF THE INVENTION

1. Field of the Invention

The present invention relates to a video recording-/reproducing camera of the type having a video camera or image pickup means and a video tape recorder or recording/reproducing means.

2. Description of the Prior Art

Conventional video recording/reproducing cameras of the type described are in general classified into ones exclusively used for recording and ones used for both recording and reproduction.

In the case of the recording with such a video recording/reproducing camera, a fast forward button, a rewind button, a reproduction button, etc. which are disposed on a control panel and are functionally associated with the reproduction mode or operation are not actuated at all. When an operator erroneously touches such control buttons during the recording mode, the recording is interrupted and is not carried out smoothly so that the so-called "continuous recording" cannot be made.

When the operator erroneously touches a control button associated with the recording mode during the reproduction mode, the signals recorded on a video tape may be erased.

Accordingly, the operator must be very careful in selecting and actuating the control buttons associated with the recording and reproduction modes. However, the video recording/reproducing cameras of the type described are in general compact in size and light in weight and have various control buttons disposed on a control panel with a limited space. As a result, the operator is encumbered with the selection and actuation of a desired control button so that erroneous operations of such control buttons tend to occur very frequently.

SUMMARY OF THE INVENTION

The present invention was made to overcome the above and other problems encountered in the conventional video recording/reproducing cameras and has an object to provide a video recording/reproducing camera in which in the recording mode the control buttons associated with the reproduction mode are prevented from being actuated or depressed and in the reproduction mode only the control buttons associated with the reproduction mode are actuated or depressed while the control buttons associated with the recording mode are prevented from being actuated or depressed.

In order to achieve these objects, a video recording/reproducing camera according to the present invention comprises:

an image pickup means for picking up an image of an object and for converting the picked up image into a video signal;

a recording/reproducing means for recording and/or reproducing the video signal;

a preventing member for preventing the touching to control members associated with the reproduction operation of the recording/reproducing means, except the recording/reproducing means is in the reproduction mode;

a sensor means for sensing whether the control members are prevented from being touched or not by the preventing member; and a control means for disabling the operation of the image pickup means and the recording operation of the recording/reproducing means and for enabling only the reproduction operation thereof when the sensor means detects that the touching to the control members is permitted.

Here, when the sensor means detects that the touching to the control members is prevented, the ejection of a cassette containing a recording medium which is loaded into the recording/reproducing means can be disabled.

The preventing member may include a cover which can cover the control members. The sensor means may include a switch to be actuated depending on whether the cover covers the control members or not. Here, the cover can slidably cover the control members. The cover may be slidable relative to the control members in the lateral direction. Alternatively, the cover may be slidable relative to the control members in the longitudinal direction. Further, the cover can swingably cover the control members. The switch can be a microswitch or a proximity switch.

The image pickup means and the recording/reproducing means can be detachably joined together. The control members can be disposed on the joint surface of the recording/reproducing means which is joined to the corresponding joint surface of the image pickup means. The sensor means may include a switch disposed at a position relating to the joint between the image pickup means and the recording/reproducing means. Here, the switch can be a microswitch or a proximity switch.

The control means may have a gate circuit for determining whether or not the trigger signal from a trigger switch for starting the recording is outputted or not in response to the output from the sensor means, so that in response to the output from the gate circuit, the image pickup means and the recording/reproducing means are triggered.

The above and other objects, effects, features and advantages of the present invention will become more apparent from the following description of preferred embodiments thereof taken in conjunction with the accompanying drawings.

BRIEF DESCRIPTION OF THE DRAWINGS

FIG. 1 is a front view showing an embodiment of a video recording/reproducing camera in accordance with the present invention;

FIG. 2 is a block diagram showing an embodiment of a circuit arrangement of the video recording/reproducing camera shown in FIG. 1;

FIG. 3A is a sectional view showing another embodiment of the cover attached to the video recording/reproducing camera in accordance with the present invention;

FIG. 3B is a front view thereof;

FIG. 4 is a sectional view showing a further embodiment of the cover in the present invention; and FIG. 5 is a front view showing another embodiment of a video recording/reproducing camera in accordance with the present invention.

DETAILED DESCRIPTION OF PREFERRED EMBODIMENTS

FIG. 1 shows a front view of an embodiment of a video recording/reproducing camera in accordance with the present invention and FIG. 2 is a block diagram thereof showing a circuit arrangement thereof.

Reference numeral 1 designates a video camera which obtains a video signal S1 by converting an optical image of an object obtained through an optical system such as a zoom lens 2 into an electrical signal and an audio signal S2 through a microphone 3. Reference numeral 4 designates a video tape recorder (to be referred to as "VTR" hereinafter in this specification) which, as will be described in more detail hereinafter, records the video signals S1 derived from the video camera 1 and the audio signals S2 derived from the microphone 3 on a videotape in a cassette placed in a cassette adapter 5 in the recording mode and functions only to reproduce the recorded signals in the reproduction mode.

Reference numeral 6 denotes a reproducing control panel associated with the reproduction mode of the VTR 4 and having various control switches such as a pause button 6A, a rewinding button 6B, a stop button 6C, a playback button 6D, a fast forward button 6E and a video tape cassette ejecting button 6F. A slidable cover 7 is slidably provided to cover the control panel 6 so that in the recording mode, the slidable cover 7 slides toward the control panel 6 to cover the control panel 6 so that the operator is prevented from erroneously touching the control buttons 6A–6F on the control panel 6 in the recording mode.

More particularly, the cover 7 slides along a pair of guide grooves 8A and 8B, which are spaced apart from each other, to open or close the control panel 6. In order to detect whether the control buttons 6A–6F are covered with the cover 7 or not, a sensor switch 9 such as a microswitch or a proximity switch is disposed at a suitable position on the control panel.

One end of the sensor switch 9 is grounded while the other end thereof is connected to an inhibit gate 10 to control the transmission of a trigger signal S3 from a trigger switch 11 for starting the recording. One end of the trigger switch 11 is grounded, while the other end thereof is connected to the inhibit gate 10. In response to the state of the signal derived from the switch 9; that is, in response to whether the cover 7 closes or opens the control panel 6, the trigger signal S3 from the trigger switch 11 passes through or does not pass through the inhibit gate 10. The trigger signal S4 thus obtained from the inhibit gate 10 is applied to the video camera 1 and the VTR 4 to trigger them.

In FIG. 1, reference numeral 12 denotes a video camera control panel having a color-temperature switching switch 12A for switching color temperature depending on the outdoor or indoor exposure, an automatic white balance button 12B for automatically attaining white balance and a back light correction button 12C.

Reference numeral 13 designates a terminal panel having an exterior output terminal 13A for outputting the reproduced image signal, a camera output terminal 13B for outputting the camera output, an external microphone terminal 13C to which an exterior microphone is attached and an external power supply terminal 13D.

Rerefence numeral 14 denotes a power supply standby switch. When the standby switch 14 is switched to the standby position, only the heater of the image pickup tube is turned on so that the recording mode is ready to start without waiting time. Reference numeral 15 denotes a zooming lever for operating the zoom lens 2. Reference numeral 16 denotes an accessory shoe and reference numeral 17 denotes a viewfinder.

In general, the video recording/reproducing camera in accordance with the present invention is switched between the recording mode and the reproduction mode depending upon the position of the cover 7 which closes or opens the control panel 6 as will be described in detail hereinafter.

In the recording mode, the cover 7 covers the control buttons 6A–6F so that the operator is prevented from erroneously touching the control buttons 6A–6F which are associated with the reproduction operation of the VTR 4. In the recording mode, the switch 9 is, for instance, closed. When a cassette is loaded into the cassette adapter 5, a video tape is extracted from the cassette and is wound around a rotary cylinder head. Therefore, unless the cassette is pulled out from the cassette adapter 5, the so-called "continuous recording" can be completely carried out even when the power supply is interrupted.

When the trigger switch 11 is depressed under the condition, the trigger signal S3 is transmitted through the inhibit gate 10 and is derived as the signal S4 therefrom which in turn is supplied to the video camera 1 and the VTR 4. It follows, therefore, that whenever the trigger switch 11 is depressed or released in the recording mode, the video camera 1 and the VTR 4 are triggered or interrupted. In this case, the power-supply standby switch 14 is ready to be turned on.

As described above, in the recording mode, the control buttons 6A–6F on the control panel 6 are covered with the cover 7, so that they are prevented from being operated. As a result, there is no danger that the so-called "continuous recording" is interrupted by erroneously touching these control buttons 6A–6F. Moreover, the cassette ejecting button 6F is prevented from being actuated, so that the cassette is prevented from being erroneously ejected from the cassette adapter 5.

In the reproduction mode, the cover 7 uncovers the control panel 6, so that the operator can actuate the control buttons 6A–6F and the switch 9 is rendered to an opposite state, for instance, opened. Therefore, even when the trigger switch 11 is depressed, the trigger signal S3 is not derived as the signal S4 from the inhibit gate 10. In the reproduction mode, therefore, the recording mode is inhibited. Even when the trigger switch 11 is erroneously depressed, no trigger signal S4 is supplied from the inhibit gate 10 to the camera 1 and the VTR 4, so that the image pickup function of the video camera 1 and the recording function of the VTR 4 are completely inhibited.

As described above, in the reproduction mode, the operator can operate the control buttons 6A–6F on the control panel 6 of the VTR 4 and only the operations such as picture search, still-picture display, etc. becomes possible. Since the complete reproduction function is carried out in this manner, there is no danger at all that the signals recorded on the video tape are erroneously erased by the erroneous operation of the trigger switch 11.

Referring next to FIGS. 3A and 3B, another embodiment of a cover in the present invention will be described. A cover 20 has its vertical sides guided by guide plates 21, so that the cover 20 can move vertically to cover or uncover the control panel 6. A lamination structure 25 consisting of a plate 22 and an elastic layer 23 is securely mounted on the main body 24 of the VTR 4 and the lamination structure 25 and the guide plates 21 define a pair of guide spaces 26 at both the right and left sides of the control panel 6. Recesses 20A are formed in the cover 20 adjacent to the upper side thereof and are so adapted to engage with projections 21A extended from the guide plates 21 when the cover 20 is moved upwardly from the guide spaces 26 to the position at which the cover 20 completely covers the control panel 6. In order to engage the projections 21A with the recesses 20A, the upper portion of the cover 20 is pushed against the main body 24 when the cover 20 is shifted upwardly to cover the control panel 6. Then, the elastic layer 23 is pushed, so that the projections 21A easily engages with the recesses 20A.

Referring next to FIG. 4, a further embodiment of a cover in the present invention will be described. A cover 28 which is swingably pivoted with a pivot pin 27 to the main body 24 of the VTR 4 covers the control panel 6. A projection 28A is extended from the free end of the cover 28 and is so adapted to engage with an engaging groove 24A formed in the main body 24 when the cover 28 is rotated to cover the control panel 6, whereby the cover 28 is locked in position with respect to the main body 24, as shown in FIG. 4. A recess 29 is formed to receive the cover 28 therein when the cover 28 is swung away from the control panel 6.

So far, the embodiments of the present invention have been described in detail in a case that the video camera and the VTR are integrated in one case. It is to be understood that the present invention is not limited to such an integral form. For example, as shown in FIG. 5, the video camera 1 and the VTR 4 may be detachably joined together in such a way that in the recording mode the video camera 1 and the VTR 4 are joined, while in the reproduction mode, the VTR 4 can be separated from the video camera 1 so that the reproduction is carried out.

In this case, the control buttons 6A-6F are disposed on the joint plane of the VTR 4 which faces with the corresponding joint plane of the video camera 1. As a result, in the recording mode in which the video camera 1 and the VTR 4 are joined together, the control buttons 6A-6F are concealed in the space between the video camera 1 and the VTR 4, so that the operator cannot touch the control buttons 6A-6F which are associated with the reproduction operation. When the control buttons 6A-6F are protruded from the joint surface of the VTR 4, as shown in FIG. 5, a recess 30 for receiving these control buttons 6A-6F therein is formed in the joint surface of the video camera 1. Alternatively, the plane having the control buttons 6A-6F may be recessed.

As described above, according to the present invention, in the recording mode, the control buttons which are associated only with the reproduction operation of the VTR are prevented from being erroneously touched by the operator so that the operator can only actuate the buttons and switches associated only with the recording operation. Thus, erroneous operations are completely prevented and the so-called "continuous recording" is smoothly and completely carried out. Furthermore, according to the present invention, the fact that the video tape recorder is switched into the reproduction mode is automatically detected by the sensor switch co-operative with the movement of the cover, so that only the reproduction operation is permitted while preventing the recording operation. As a result, there is no problem that the signals recorded on the video tape are erroneously erased.

What is claimed is:

1. A video recording/reproducing camera comprising:
    an image pickup means for picking up an image of an object and for converting said picked up image into a video signal;
    a recording/reproducing means for recording and/or reproducing said video signal;
    means for initiating a recording operation by said recording/reproducing means;
    a preventing member for preventing the touching of control members associated with a reproduction operation of said recording/reproducing means, except when said recording/reproducing means is in a reproduction mode;
    a sensor means for sensing whether said control members are prevented from being touched by said preventing member; and
    a control means for disabling operation of said initiating means and enabling only a reproduction operation of said recording/reproducing means when said sensor means detects that said preventing member permits the touching of said control members, and for enabling operation of said initiating means when said sensor means detects that the touching of said control members is prevented.

2. A video recording/reproducing camera as claimed in claim 1, wherein when said sensor means detects that the touching of said control members is prevented, the ejection of a cassette containing a recording medium which is loaded into said recording/reproducing means is disabled.

3. A video recording/reproducing camera as claimed in claim 1, wherein said preventing member includes a cover which can cover said control members; and said sensor means includes a switch to be actuated depending on whether said cover covers said control members or not.

4. A video recording/reproducing camera as claimed in claim 3, wherein said cover can slidably cover said control members.

5. A video recording/reproducing camera as claimed in claim 4, wherein said cover is slidable relative to said control members in the lateral direction.

6. A video recording/reproducing camera as claimed in claim 4, wherein said cover is slidable relative to said control members in the longitudinal direction.

7. A video recording/reproducing camera as claimed in claim 3, wherein said cover can swingably cover said control members.

8. A video recording/reproducing camera as claimed in claim 3, wherein said switch is a microswitch or a proximity switch.

9. A video recording/reproducing camera as claimed in claim 1, wherein said image pickup means and said recording/reproducing means are detachably joined together; said control members are disposed on the joint surface of said recording/reproducing means which is joined to the corresponding joint surface of said image pickup means; and said sensor means includes a switch disposed at a position relating to the joint between said image pickup means and said recording/reproducing means.

10. A video recording/reproducing camera as claimed in claim 9, wherein said switch is a microswitch or a proximity switch.

11. A video recording/reproducing camera as claimed in claim 1 wherein said initiating means is a trigger switch which provides a trigger signal to initiate a recording operation of said recording/reproducing means.

12. A video recording/reproducing camera as claimed in claim 11, wherein said control means has a gate circuit for determing whether or not the trigger signal from said trigger switch for starting the recording operation is outputted or not in response to the output from said sensor means, so that in response to the output from said gate circuit, said image pickup means and said recording/reproducing means are triggered into a recording operation.

* * * * *